W. E. MORAN.
APPARATUS FOR THAWING FROZEN GROUND.
APPLICATION FILED MAR. 13, 1920.

1,390,457. Patented Sept. 13, 1921.

Inventor
William E. Moran
By William M. Swan
Attorney

UNITED STATES PATENT OFFICE.

WILLIAM E. MORAN, OF DETROIT, MICHIGAN.

APPARATUS FOR THAWING FROZEN GROUND.

1,390,457.   Specification of Letters Patent.   Patented Sept. 13, 1921.

Application filed March 13, 1920. Serial No. 365,391.

*To all whom it may concern:*

Be it known that I, WILLIAM E. MORAN, a citizen of the United States, residing at Detroit, county of Wayne, State of Michigan, have invented a certain new and useful Improvement in Apparatus for Thawing Frozen Ground, and declare the following to be a full, clear, and exact description of the same, such as will enable others skilled in the art to which it pertains to make and use the same, reference being had to the accompanying drawings, which form a part of this specification.

This invention relates to apparatus for thawing frozen ground, ore or coal piles or the like, and has for its object an improved arrangement of parts whereby live steam may be used at any desired distance from the generative source to thaw the ground along a line selected for excavation, the steam being projected thereagainst from one or more of a series of nozzles, the heat of the steam backed by the force with which it is projected serving to quickly and economically thaw out the ground.

Figure 1:
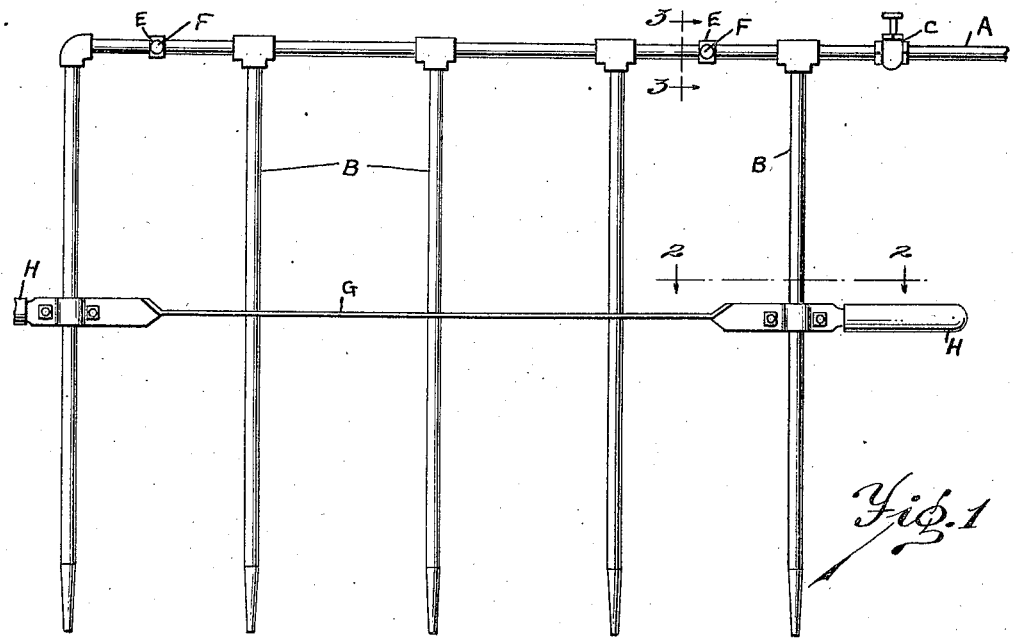
Figure 1 is an elevational view of my improved device, especially adapted for thawing out a considerable lengthwise section of ground of relatively narrow width, as for example, the side of a proposed trench.
Figure 2:
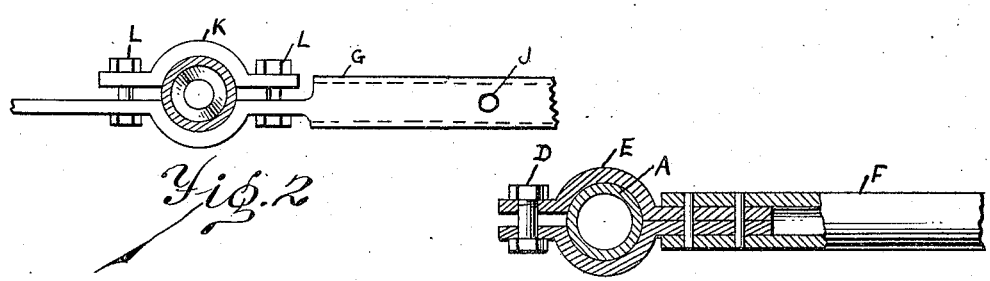
Fig. 2 is a detail view, partly in section, along the line 2—2 of Fig. 1.
Figure 3:
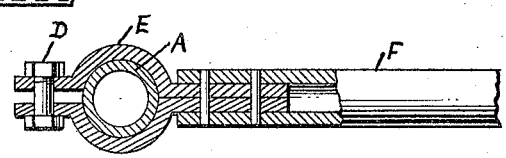
Fig. 3 is a similar view along the line 3—3 of Fig. 1.
Figure 4:
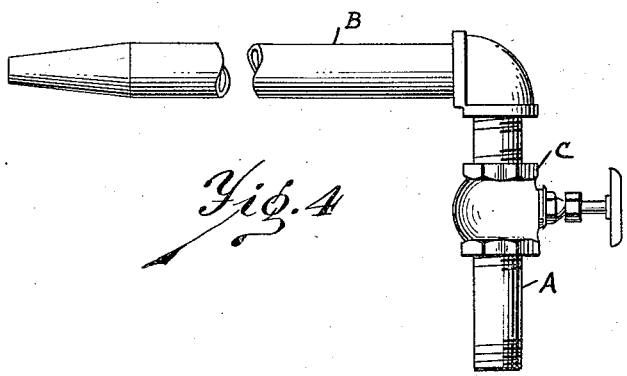
Fig. 4 is an enlarged detail of an individual nozzle.

A represents the feed pipe leading from a suitable source of steam supply, from which lead off the individual nozzles B, at desired intervals, the access of steam to that part of the pipe A from which the nozzle pipes B lead, being controlled by the valve C. At suitable intervals along the pipe A are removably located encircling clamp pieces E which are held tightly about the pipe A by means of the bolts D, and from each of which the handle F projects laterally with respect to the pipe A, so that regardless of the heat therein caused by the steam, the nozzle members may be safely and easily aimed along the line of the proposed trench whose thawing is desired. Whether several nozzles B be employed, or whether only a single nozzle be employed, when thus supported, the user may move the apparatus to and fro along the line of the proposed trench, so the ground is subject to repeated heatings, even though spaced by brief time intervals; in the case of the multiple device illustrated in Fig. 1, such a movement lengthwise of the strip of ground whose thawing is desired results in each point therein being quickly and in rapid succession subjected to one after the other of the steam jets.

At G is illustrated a reinforcing strap or brace piece, which, though not indispensable if the individual nozzles B are relatively short, is of great utility in holding the end portions of the nozzles against wavering relatively to one another, as for example, when each is of such length that when the tips are in proximity to the ground, the pipe A and the handle pieces are approximately waist high. This brace may have its flat or strapped center portion perforated as at J for the engagement of some one of the intermediate nozzle pieces B directly therethrough, but the end nozzles are shown as adapted to be engaged by the removable holders K, which are held in place by the bolts L. A handle H may also be advantageously placed at one or both ends of this brace piece to further facilitate the accurate aiming of the nozzles relatively to the ground to be thawed.

What I claim is:

1. In combination with a common connection to a source of steam supply, a plurality of nozzle members projecting laterally therefrom in substantially parallel relation, a valve controlling the flow of steam to said nozzles, means adjustably located intermediate the length of the nozzle members for maintaining their discharge ends in substantial alinement one with another, and handle members detachably secured to that portion of the pipe connection from which said nozzle members project, for guiding the discharge ends of the nozzles along the line of earth to be thawed.

2. In combination with a plurality of tapered nozzle members, adjustable means for spacedly holding their discharge ends in alined relation, a common connection for said nozzles to a source of steam supply, the points of union thereof with the several nozzle members coöperating with said adjustable holding means in maintaining said nozzles in substantially parallel relation to one another, a valve for controlling the flow of steam through said common connection, and handle members mounted on said connection, whereby the alined discharge ends of said nozzles may be guided along the line of earth to be thawed.

3. In combination with a valve-controlled supply pipe, a plurality of discharge nozzles projecting laterally therefrom, adjustable handle members carried on said supply pipe adjacent the points of union therewith of said discharge nozzles, and means detachably connected with each of said discharge nozzles whereby they are maintained in substantial alinement for guidance by means of said handles along the line of earth to be thawed.

In testimony whereof I sign this specification in the presence of two witnesses.

WILLIAM E. MORAN.

Witnesses:
WILLIAM M. SWAN,
JEFFERSON G. THURBER.